UNITED STATES PATENT OFFICE.

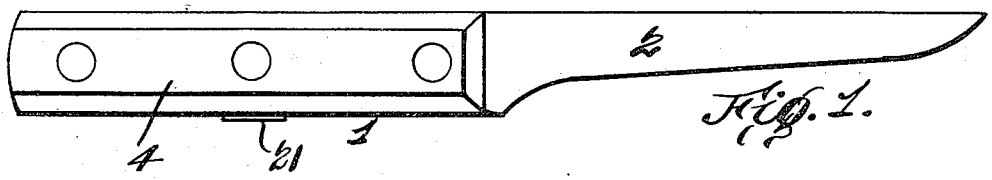
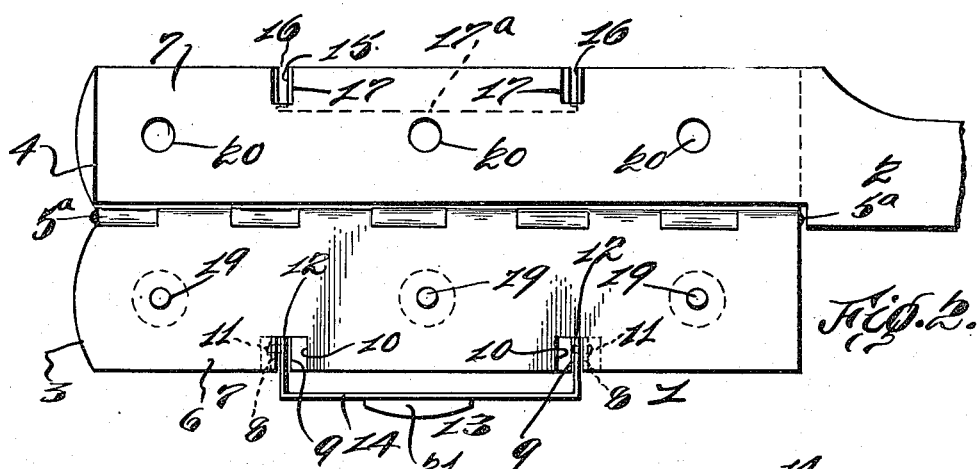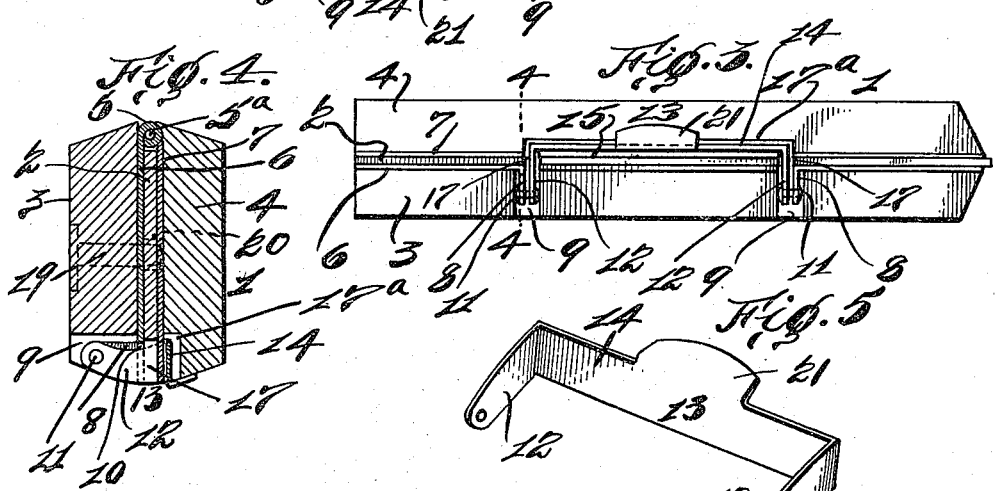

SAMUEL ENZLER, OF NEW YORK, N. Y.

KNIFE.

1,147,853.

Specification of Letters Patent.

Patented July 27, 1915.

Application filed May 8, 1915. Serial No. 26,698.

*To all whom it may concern:*

Be it known that I, SAMUEL ENZLER, a subject of the Emperor of Austria-Hungary, residing at New York city, borough of Manhattan, county and State of New York, have invented certain new and useful Improvements in Knives, of which the following is a full, clear, and exact description.

This invention relates to an improvement in knives, but pertains more particularly to the means for securing the blade to the handle, and has for an object to secure the handles and blades of knives in such manner as to permit the ready removal of the blades for any purpose whatsoever, such for instance as the substitution of other blades, of greater or less length or of different configuration.

I will now proceed to describe my invention in detail, the essential features of which will be summarized in the appended claims, reference being had to the accompanying drawing, forming part hereof; wherein, Figure 1 is a side elevation of a knife embodying my improvement; Fig. 2 is an enlarged view of the handle opened to show the blade and means to releasably secure the handle members together; Fig. 3 is a bottom plan view of the handle; Fig. 4 is an enlarged cross-sectional view, the section being taken on a line 4—4 in Fig. 3, and Fig. 5 is a perspective view of the securing latch.

My improvement consists of a handle 1 and blade 2 removably secured thereto, the handle 1 consisting of members 3 and 4 hinged together as at 5. Each member 3 and 4 carries a plate 6 and 7 respectively. Along one of the edges of each plate is formed a hinge-member, pivotally secured in position by a pin $5^a$, the plates being suitably secured to their handle members. The plate 6 on the handle-member 3 is provided with ears 8 which project inwardly into sockets 9 in said handle-member 3. The plate 6 is slotted as at 10, the said slots alining with the pockets 9 in the handle member 3. To the ears 8 I pivotally secure, as at 11, the free ends 12 of a keeper or latch 13 having a locking-bar 14.

To coöperate with the locking-bar 14, I provide the plate 7 on the handle member 4 with a resilient tongue 14 produced by slotting the plate 7 as at 16, the said slots 16 alining with slots 17 in the knife blade 2. The slots 16 and 17 also aline with a pocket $17^a$ formed in the handle-member 4.

When the latch 13 is swung outwardly, as shown in Fig. 2, the handle members can be opened to permit the blade 2 to be removed. To secure the handle and blade together, the blade will be placed upon one of the handle members 4 (for instance) and the other handle member closed, at which time pins 19 in the handle member 3 (in this instance) will enter openings 20 in the blade and prevent the withdrawal of the blade. After the handle members have been closed, the latch or keeper 13 will be moved over to the position shown in Fig. 3 to engage the tongue 15 which will slightly yield when the keeper contacts therewith. A thumb-piece 21 is provided to facilitate the manipulation of the latch or keeper 13. As will be seen in Fig. 4, the locking-bar 14 of the keeper 13 lies in the pocket $17^a$ when the handle members are closed.

Having now described my invention, what I claim and desire to secure by Letters Patent is:

1. A knife consisting of a blade provided with openings in the body thereof and with slots in one of its edges, a handle therefor, consisting of a plurality of hinged members, a plate carried by one of said members, a latch pivotally secured thereto, a plate carried by the other handle-member, a resilient tongue carried thereby arranged to engage said latch when said handle members are closed upon said blade, and pins carried by one of the handle members to engage the openings in said blade, said slots being arranged to receive said latch when said handle members are closed.

2. A knife consisting of a blade, a handle therefor, consisting of a plurality of hinged members, one of said handle-members being provided with sockets, a plate carried by said handle-member, ears carried by said plate extending into said sockets, a keeper pivotally secured at each end thereof to said ears, a locking-bar carried by said keeper, the other handle-member having a pocket arranged to receive the locking-bar, a plate carried by the second named handle-member, and a resilient tongue carried by said plate arranged in alinement with said pocket and adapted to engage said locking-bar when said handle-members are closed upon said blade and locked by said keeper.

3. A knife consisting of a blade, a handle therefor, consisting of a plurality of hinged members, one of said handle-members being provided with sockets, a plate carried by said handle-member, ears carried by said plate extending into said sockets, a keeper pivotally secured at each end thereof to said ears, a locking-bar carried by said keeper, the other handle-member having a pocket arranged to receive the locking-bar, a plate carried by the second-named handle-member, a resilient tongue carried by said plate arranged in alinement with said pocket and adapted to engage said locking-bar when said handle-members are closed upon said blade and locked by said keeper, said blade being provided with slots alining with said keeper and arranged for engagement by said keeper.

4. A knife consisting of a blade, a handle therefor, consisting of a plurality of hinged members, one of said handle-members being provided with sockets, a plate carried by said handle-members, ears carried by said plate extending into said sockets, a keeper pivotally secured at each end thereof to said ears, a locking-bar carried by said keeper, the other handle-member having a pocket arranged to receive the locking-bar, a plate carried by the second named handle-member, a resilient tongue carried by said plate arranged in alinement with said pocket and adapted to engage said locking-bar when said handle-members are closed upon said blade and locked by said keeper, and a plurality of pins carried by the keeper-carrying handle-member, said blade being provided with slots alining with said keeper and arranged for engagement by said keeper, the blade being also provided with openings alining with the pins on the keeper-carrying handle-member.

Signed at New York city, N. Y. this 6th day of May, 1915.

SAMUEL ENZLER.

Witnesses:
AB. GREENBERG,
STANISLAUS S. FLETCHER.

Copies of this patent may be obtained for five cents each, by addressing the "Commissioner of Patents, Washington, D. C."